3,531,455
PEROXIDE-CURED CHLORINATED POLYETHYLENE

Robert Michael Straub, Heritage Park, Wilmington, Del., assignor to E. I. du Pont de Nemours and Company, Wilmington, Del., a corporation of Delaware
No Drawing. Filed Apr. 28, 1967, Ser. No. 634,508
Int. Cl. C08f 27/00
U.S. Cl. 260—94.9     9 Claims

ABSTRACT OF THE DISCLOSURE

A curable chlorinated polyethylene composition comprising a chlorinated polyethylene containing 20–50% by weight chlorine and having a molecular weight of at least 20,000, 1–10 parts of an organic peroxide and about 0.5–5 parts of triallylcyanurate per 100 parts of polymer. The combination of organic peroxide and triallyl cyanurate provides a curing system for chlorinated polyethylenes which upon being subjected to heat gives tightly vulcanized products and has a high degree of processing safety.

BACKGROUND OF THE INVENTION

This invention relates to vulcanizable chlorinated polyethylene compositions. More particularly it relates to vulcanizable chlorinated polyethylenes having incorporated therein an organic peroxide and triallyl cyanurate.

Chlorinated polyethylene elastomers are well known materials in the rubber art. They are prepared from branched or linear polyethylene by homogeneous solution chlorination or by chlorination of dispersions of finely divided polyethylene in water or other suitable dispersing media. Solution chlorination gives a chlorinated polyethylene of relatively uniform distribution of chlorine atoms on the polymer chain, while dispersion chlorination gives products with a more random distribution of chlorine. Using either method, it is well known that the introduction into the polymer molecule of between 20 and 50% chlorine atoms by weight produces an elastomeric product from polyethylenes which are highly crystalline before chlorination.

Useful elastomeric products must necessarily be vulcanized, i.e., "cured," by cross-linking. Vulcanization of chlorinated polyethylenes has generally been unsatisfactory prior to the present invention, and the products known as chlorosulfonated polyethylenes, which contain a minor proportion of sulfonyl chloride groups as reactive cross-linking sites are often employed in applications where the simple chlorinated polyethylenes might otherwise be preferred. It has been recommended in the art to vulcanize chlorinated polyethylenes with peroxides, for example, in U.S. Pat. 2,534,078 to Strain, but vulcanizates so obtained are difficult to prepare and have not had physical properties adequate for many uses.

It is well known to promote the peroxide vulcanization of saturated chain elastomers such as the simple polyolefins, ethylene/vinyl chloride copolymers, ethylene/vinyl acetate copolymers and the like by including in the formulation any of a variety of polyunsaturated co-agents. Among those disclosed in the prior are are various maleimides, diallyl phthalate, divinyl benzene, triallyl cyanurate, triallyl phosphate, triacryloylhexahydrotriazine and so on. However, no suitable peroxide curing system has been disclosed for the vulcanization of chlorinated polyethylene. U.S. Pat. 2,958,672 to Goldberg recommends the use of peroxides with m-phenylene bismaleimide or with triacryloylhexahydrotriazine (TAH) for this purpose, but chlorinated polyethylene has never achieved significant use because a satisfactory combination of state of cure and processing safety cannot be achieved by use of these coagents.

SUMMARY OF THE INVENTION

It has been discovered that chlorinated polyethylene compositions which can be effectively vulcanized are prepared by incorporating into a chlorinated polyethylene polymer containing about 20–50% by weight chlorine and having a molecular weight of at least about 20,000, about 1–10 parts by weight per 100 parts of polymer of an organic peroxide and about 0.5–5 parts by weight per 100 parts of polymer of triallyl cyanurate.

DETAILED DESCRIPTION

The chlorinated polyethylenes used in this invention are those containing about 20–50% by weight chlorine and which have a molecular weight of at least about 20,000. They can be linear or branched, and can be prepared by solution chlorination as illustrated in U.S. Patent 2,405,971 to McAlevy or dispersion chlorination as illustrated in British Pat. 950,374 and French Pat. 1,433,671.

Any of the peroxides normally used in curing elastomeric products can be employed in this invention. Representative types of peroxides are aryl peroxides, acyl peroxides, aralkyl peroxides, alkyl peroxides and ketone peroxides. Specific examples are dicumyl peroxide and its higher homologues, dibenzoyl peroxide, lauroyl peroxide, succinyl peroxide, methyl ethyl ketone peroxide, n-butyl 4,4'-bis(t-butyl peroxy) valerate, acetyl peroxide, dicamphoryl peroxide, phthalyl peroxide, tertiary butyl hydroperoxide, ethyl percamphorate, hydroxyalkyl hydroperoxides and other similar organic peroxides or substances which give rise to such peroxides under the hereinafter described reaction conditions. Dicumyl peroxide is preferred because of the fast rate of cure and excellent vulcanizate properties which result from its use. The organic peroxides are added in the amount of about 1–10 parts by weight per 100 parts of chlorinated polyethylene. A preferred amount is about 1.5–5 parts. Peroxide present in this quantity is economical and yet provides an adequate rate of cure.

The triallyl cyanurate is added in the amount of about 0.5–5 parts by weight per 100 parts of chlorinated polyethylene. Triallyl cyanurate present in the amount of about 1–3 parts is preferred because it provides adequate curing without undue expense.

The normal methods of mixing, processing and molding employed by the rubber industry are used to cure the compositions of this invention. Various compounding agents such as vulcanization aids, fillers, plasticizers and the like can be used.

The compositions of this invention are cured by subjecting them to heat. The temperatures used are those ordinarily employed in the curing of elastomeric materials, typically ranging from about 150° C.–250° C. The time required for curing the composition will vary with the temperature, activity of the peroxide used, and state of cure desired but can be routinely determined by one skilled in the art. The cure is generally effected under superatmospheric pressures, however the pressure used is not critical and can vary from about atmospheric to 2000 p.s.i.g.

The compositions of this invention make possible the preparation of safe processing high quality chlorinated polyethylene vulcanizates by means of a simple reliable process. The invention is useful in the manufacture of various articles of commerce such as wire coverings, hose, tubing, roofing materials, flashings, molded goods and the like.

The invention is better illustrated by the examples which follow wherein parts are by weight unless otherwise indiciated. The polymers used in the examples are as follows:

Polymer A is made by solution chlorination of a linear polyethylene of melt index 4 and a stress exponent of about 1.45. It contains 34% chlorine.

Polymer B is made by solution chlorination of a linear polyethylene of melt index 4 and a stress exponent of about 1.45. It contains 43% chlorine.

Polymer C is a chlorinated polyethylene containing 40% chlorine. Polymer C is commercially available as "Plaskon" CPE 500 and is believed to be made by chlorination of an aqueous dispersion of very high molecular weight polyethylenes.

EXAMPLE 1

100 parts of Polymer A, 7 parts of magnesium oxide, 40 parts of SRF carbon black, 5 parts of dicumyl peroxide (40% active ingredient, commercially available as "DiCup 40 C) and 2 parts of triallyl cyanurate (TAC) are blended together on a roll mill. The composition is then sheeted off the mill. From this sheet, 4 x 6 x .075 inch slabs are vulcanized in a standard laboratory press at 320° F. for 10, 20, and 40 minutes.

A control sample is prepared in the same way, except the triallyl cyanurate is omitted.

The physical properties of the two vulcanizates are determined by standard ASTM procedures and are compared in the following table:

|  | Test sample (TAC) | Control [1] (no TAC) |
|---|---|---|
| Modulus at 100% elongation, p.s.i.: |  |  |
| Vulcanized 10 minutes at 160° C | 650 | 400 |
| Vulcanized 20 minutes at 160° C | 670 | 460 |
| Vulcanized 40 minutes at 160° C | 820 | 500 |
| Modulus at 200% elongation, p.s.i.: |  |  |
| Vulcanized 10 minutes at 160° C | 2,200 | 800 |
| Vulcanized 20 minutes at 160° C | 2,860 | 1,200 |
| Vulcanized 40 minutes at 160° C |  | 1,250 |
| Tensile strength at break, p.s.i.: |  |  |
| Vulcanized 10 minutes at 160° C | 3,030 | 2,000 |
| Vulcanized 20 minutes at 160° C | 3,200 | 2,590 |
| Vulcanized 40 minutes at 160° C | 3,100 | 2,800 |
| Elongation at break, p.s.i.: |  |  |
| Vulcanized 10 minutes at 160° C | 260 | 600 |
| Vulcanized 20 minutes at 160° C | 220 | 440 |
| Vulcanized 40 minutes at 160° C | 190 | 400 |
| Hardness, Durometer A: |  |  |
| Vulcanized 10 minutes at 160° C | 75 | 75 |
| Vulcanized 20 minutes at 160° C | 76 | 75 |
| Vulcanized 40 minutes at 160° C | 77 | 76 |
| Permanent set at break, percent: Vulcanized 10 minutes at 160° C | 6 | 70 |
| Compression set, Method B, ASTM D-395: Vulcanized 40 minutes at 160° C. Aged 22 hours at 70° C., percent | 10 | 28 |

[1] Outside the scope of invention, included for comparison purposes only.

EXAMPLE 2

The procedure of Example 1 is repeated substituting Polymer B for Polymer A. The control and test sample vulcanizates have the following properties:

|  | Test sample (TAC) | Control [1] (no TAC) |
|---|---|---|
| Modulus at 100% elongation, p.s.i.: |  |  |
| Vulcanized 10 minutes at 160° C | 620 | 460 |
| Vulcanized 20 minutes at 160° C | 800 | 500 |
| Vulcanized 40 minutes at 160° C | 850 | 550 |
| Modulus at 20% elongation, p.s.i.: |  |  |
| Vulcanized 10 minutes at 160° C | 1,800 | 1,090 |
| Vulcanized 20 minutes at 160° C | 2,420 | 1,370 |
| Vulcanized 40 minutes at 160° C | 2,600 | 1,500 |
| Tensile strength at break, p.s.i.: |  |  |
| Vulcanized 10 minutes at 160° C | 2,600 | 1,800 |
| Vulcanized 20 minutes at 160° C | 3,100 | 2,390 |
| Vulcanized 40 minutes at 160° C | 3,250 | 2,600 |
| Elongation at break, p.s.i.: |  |  |
| Vulcanized 10 minutes at 160° C | 390 | 580 |
| Vulcanized 20 minutes at 160° C | 280 | 540 |
| Vulcanized 40 minutes at 160° C | 260 | 460 |
| Hardness, Durometer A: |  |  |
| Vulcanized 10 minutes at 160° C | 81 | 80 |
| Vulcanized 20 minutes at 160° C | 84 | 80 |
| Vulcanized 40 minutes at 160° C | 82 | 81 |
| Permanent set at break, percent: Vulcanized 10 minutes at 160° C | 16 | 46 |
| Compression set, Method B—ASTM D-395: Vulcanized 40 minutes at 160° C. Aged 22 hours at 70° C., percent | 22 | 43 |

[1] Outside scope of invention, included for comparison purposes only.

EXAMPLE 3

The procedure of Example 1 is repeated using 100 parts of Polymer C instead of Polymer A. The properities of the control and test sample vulcanizates are as follows:

|  | Test sample (TAC) | Control [1] (no TAC) |
|---|---|---|
| Modulus at 100% elongation p.s.i.: |  |  |
| Vulcanized 10 minutes at 160° C | 880 | 560 |
| Vulcanized 20 minutes at 160° C | 1,050 | 600 |
| Vulcanized 40 minutes at 160° C | 1,050 | 640 |
| Modulus at 200% elongation p.s.i.: |  |  |
| Vulcanized 10 minutes at 160° C | 3,420 | 2,310 |
| Vulcanized 20 minutes at 160° C | 3,820 | 2,500 |
| Vulcanized 40 minutes at 160° C | 3,950 | 2,730 |
| Tensile strength at break, p.s.i.: |  |  |
| Vulcanized 10 minutes at 160° C | 4,100 | 4,010 |
| Vulcanized 20 minutes at 160° C | 3,950 | 4,200 |
| Vulcanized 40 minutes at 160° C | 4,220 | 4,220 |
| Elongation at break, p.s.i.: |  |  |
| Vulcanized 10 minutes at 160° C | 250 | 380 |
| Vulcanized 20 minutes at 160° C | 200 | 340 |
| Vulcanized 40 minutes at 160° C | 230 | 310 |
| Hardness, Durometer A: |  |  |
| Vulcanized 10 minutes at 160° C | 77 | 75 |
| Vulcanized 20 minutes at 160° C | 75 | 77 |
| Vulcanized 40 minutes at 160° C | 75 | 75 |
| Permanent set at break, percent: Vulcanized 10 minutes at 160° C | 6 | 9 |
| Compression set, Method B, ASTM D-395: Vulcanized 40 minutes at 160° C. Aged 22 hours at 70° C., percent | 12 | 22 |

[1] Outside scope of invention, included for comparison purposes only.

The data in the three preceding examples are indicative of the excellent state of cure attained in a practically short time by the composition of this invention.

EXAMPLE 4

This example illustrates the much greater processing safety of triallyl cyanurate (TAC) over that of triacryloylhexahydrotriazine (TAH), a vulcanizing coagent frequently used in the prior art with peroxides in curing other types of polymers.

The procedure of Example 1 is followed, using Polymer B and n-butyl 4,4'-bis(t-butyl peroxy) valerate (commercially available as "Luperco" 230 XC) as the peroxide. The TAH gives a composition that has an impractically short scorch time as shown by the following data:

|  | Sample 1 | Sample 2 [1] |
|---|---|---|
| Polymer B | 100 | 100 |
| Magnesium oxide | 7 | 7 |
| SRF black | 40 | 40 |
| n-Butyl 4,4'-bis(t-butyl peroxy) valerate [2] | 4 | 4 |
| Triallyl cyanurate | 2 |  |
| Triacryloylhexahydrotriazine |  | 2 |
| Mooney scorch MS at 135° C.: |  |  |
| Minimum viscosity | 37 | 62 |
| Minutes to 5 point rise | 12 | 3 |
| Minutes to 10 point rise | 17 | 3.5 |
| Modulus at 100% elongation, p.s.i.: Cure 40 minutes at 160° C | 1300 | 1400 |
| Modulus at 200% elongation, p.s.i.: Cure 40 minutes at 160° C | 2250 | 2450 |
| Tensile strength at break, p.s.i.: Cure 40 minutes at 160° C | 2780 | 2550 |
| Elongation at break, percent: Cure 40 minutes at 160° C | 300 | 270 |
| Hardness Durometer A: Cure 40 minutes at 160° C | 85 | 83 |
| Permanent set at break, percent: Pure 40 minutes at 160° C | 5 | 5 |

[1] Outside the scope of invention, included for comparison purposes only.
[2] 50% active ingredient.

The outstanding processing safety of the sample containing TAC is reflected in the Mooney Scorch data.

EXAMPLE 5

Following the procedure of Example 1, 100 parts of Polymer A, 25 parts of litharge, 40 parts of SRF carbon black, 3 parts of dicumyl peroxide (40% active ingredient, "DiCup" 40 C), and 2 parts of triallyl cyanurate are compounded and a test slab vulcanized at 160° C. for 30 minutes. The compounded stock has excellent processing safety as exhibited by the Mooney Scorch test at 121° C. showing only a 2 point rise in viscosity in 45 minutes. The vulcanized test piece shows a modulus at 100% extension of 700 p.s.i. and a tensile strength of 2980 at 280% elongation.

What is claimed is:

1. A curable chlorinated polyethylene composition consisting essentially of a chlorinated polyethylene polymer having from about 20–50% by weight chlorine and a molecular weight of at least about 20,000, said chlorinated polyethylene having incorporated therein from about 1.0–10 parts by weight per 100 parts of polymer of an organic peroxide and from about 0.5 to 5 parts by weight per 100 parts of polymer of triallyl cyanurate.

2. The composition of claim 1 wherein the organic peroxide is dicumyl peroxide.

3. The composition of claim 1 wherein the organic peroxide is present in the amount of about 1.5–5 parts by weight per 100 parts of polymer and the triallyl cyanurate is present in the amount of about 1–3 parts by weight per 100 parts of polymer.

4. The composition of claim 3 wherein the organic peroxide is dicumyl peroxide.

5. In the process for curing a chlorinated polyethylene polymer containing from about 20–50% by weight chlorine and having a molecular weight of at least about 20,000 which comprises incorporating into said polymer about 1.0–10 parts by weight per 100 parts of polymer of an organic peroxide and subjecting the resulting composition to heat, the improvement which comprises incorporating into said polymer about 0.5–5 parts by weight per 100 parts of polymer of triallyl cyanurate.

6. The process of claim 5 wherein the organic peroxide is dicumyl peroxide.

7. The process of claim 5 wherein the organic peroxide is present in the amount of about 1.5–5 parts by weight per 100 parts of polymer and the triallyl cyanurate is present in the amount of about 1–3 parts by weight per 100 parts of polymer.

8. The process of claim 7 wherein the organic peroxide is dicumyl peroxide.

9. The vulcanized chlorinated polyethylene prepared by the process of claim 5.

References Cited

UNITED STATES PATENTS

| | | | |
|---|---|---|---|
| 3,260,694 | 7/1966 | Wang | 260—41 |
| 2,984,655 | 5/1961 | Kirk | 260—41 |
| 3,275,592 | 9/1966 | Ostwald | 260—41 |

FOREIGN PATENTS

| | | |
|---|---|---|
| 599,198 | 5/1960 | Canada. |
| 853,640 | 11/1960 | Great Britain. |
| 952,336 | 3/1964 | Great Britain. |
| 1,035,601 | 7/1966 | Great Britain. |

JOSEPH L. SCHOFER, Primary Examiner

R. A. GAITHER, Assistant Examiner